(12) United States Patent
Kuniba

(10) Patent No.: US 7,778,478 B2
(45) Date of Patent: Aug. 17, 2010

(54) IMAGE PROCESSING DEVICE, IMAGE PROCESSING PROGRAM, IMAGE PROCESSING METHOD, AND ELECTRONIC CAMERA FOR CONTROLLING DEGREE OF NOISE REDUCTION IN IMAGE DATA

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 231 days.

(21) Appl. No.: 11/443,047

(22) Filed: May 31, 2006

(65) Prior Publication Data
US 2006/0215925 A1 Sep. 28, 2006

Related U.S. Application Data

(63) Continuation of application No. PCT/JP2004/017956, filed on Dec. 2, 2004.

(30) Foreign Application Priority Data

Dec. 3, 2003 (JP) .............................. 2003-404425

(51) Int. Cl.
*G06K 9/40* (2006.01)
(52) U.S. Cl. ..................... 382/254; 382/276
(58) Field of Classification Search ................. 382/254
See application file for complete search history.

(56) References Cited

U.S. PATENT DOCUMENTS

| 5,420,633 | A | | 5/1995 | Matoba |
| 5,715,334 | A | * | 2/1998 | Peters ..................... 382/254 |
| 5,724,456 | A | * | 3/1998 | Boyack et al. ............. 382/274 |
| 5,991,456 | A | | 11/1999 | Rahman et al. |
| 6,215,911 | B1 | * | 4/2001 | Goertler et al. ............ 382/264 |
| 6,252,931 | B1 | | 6/2001 | Aach et al. |
| 6,535,648 | B1 | * | 3/2003 | Acharya .................... 382/274 |
| 6,813,389 | B1 | | 11/2004 | Gindele et al. |
| 6,856,702 | B2 | | 2/2005 | Gallagher |
| 7,386,185 | B2 | * | 6/2008 | Watanabe et al. .......... 382/274 |
| 2001/0030707 | A1 | | 10/2001 | Fujii |
| 2004/0184667 | A1 | * | 9/2004 | Raskar et al. .............. 382/254 |

FOREIGN PATENT DOCUMENTS

EP 1 345 170 A1 9/2003

(Continued)

OTHER PUBLICATIONS

Stahl M. et al., "Noise-Resistant weak-structure enhancement for digital radiography." SPIE Conference on Image Processing, San Diego, CA, vol. 3661. Feb. 1999.

*Primary Examiner*—Bhavesh M Mehta
*Assistant Examiner*—Stephen R Koziol
(74) *Attorney, Agent, or Firm*—Oliff & Berridge, PLC

(57) ABSTRACT

An image processing device changes degree of noise reduction for image data in accordance with tone correction to be performed according to the image data and includes a change rate acquisition part and a noise reduction part. The change rate acquisition part obtains, at a plurality of portions in the image data, a change rate of a signal level of the image data before and after tone correction. The noise reduction part controls a degree of noise reduction for each portion in the image data according to the change rate.

11 Claims, 4 Drawing Sheets

FOREIGN PATENT DOCUMENTS

| | | |
|---|---|---|
| JP | A-04-373361 | 12/1992 |
| JP | A-2001-251549 | 9/2001 |
| JP | A-2002-044484 | 2/2002 |
| JP | A-2002-125139 | 4/2002 |
| JP | A-2003-101887 | 4/2003 |

* cited by examiner

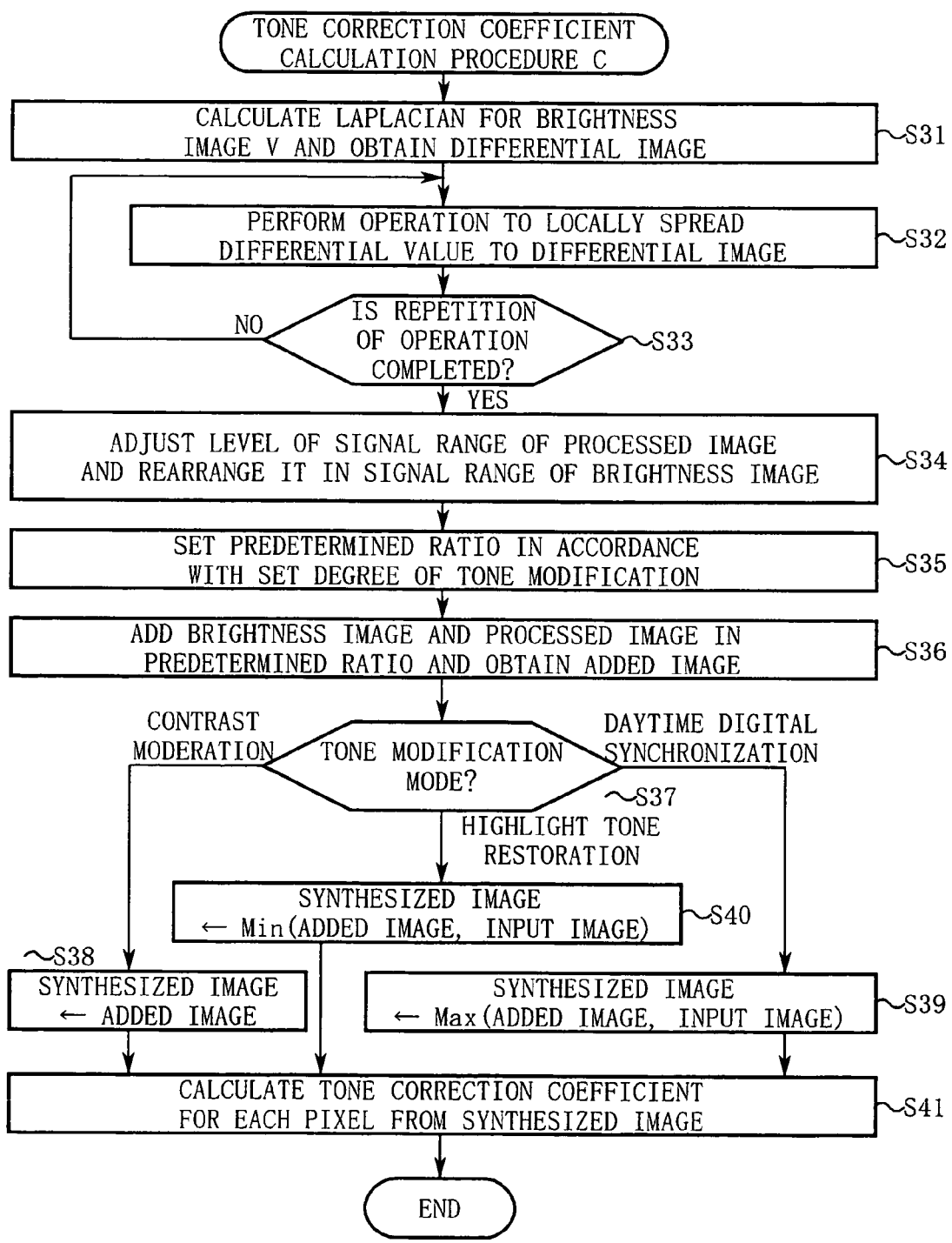

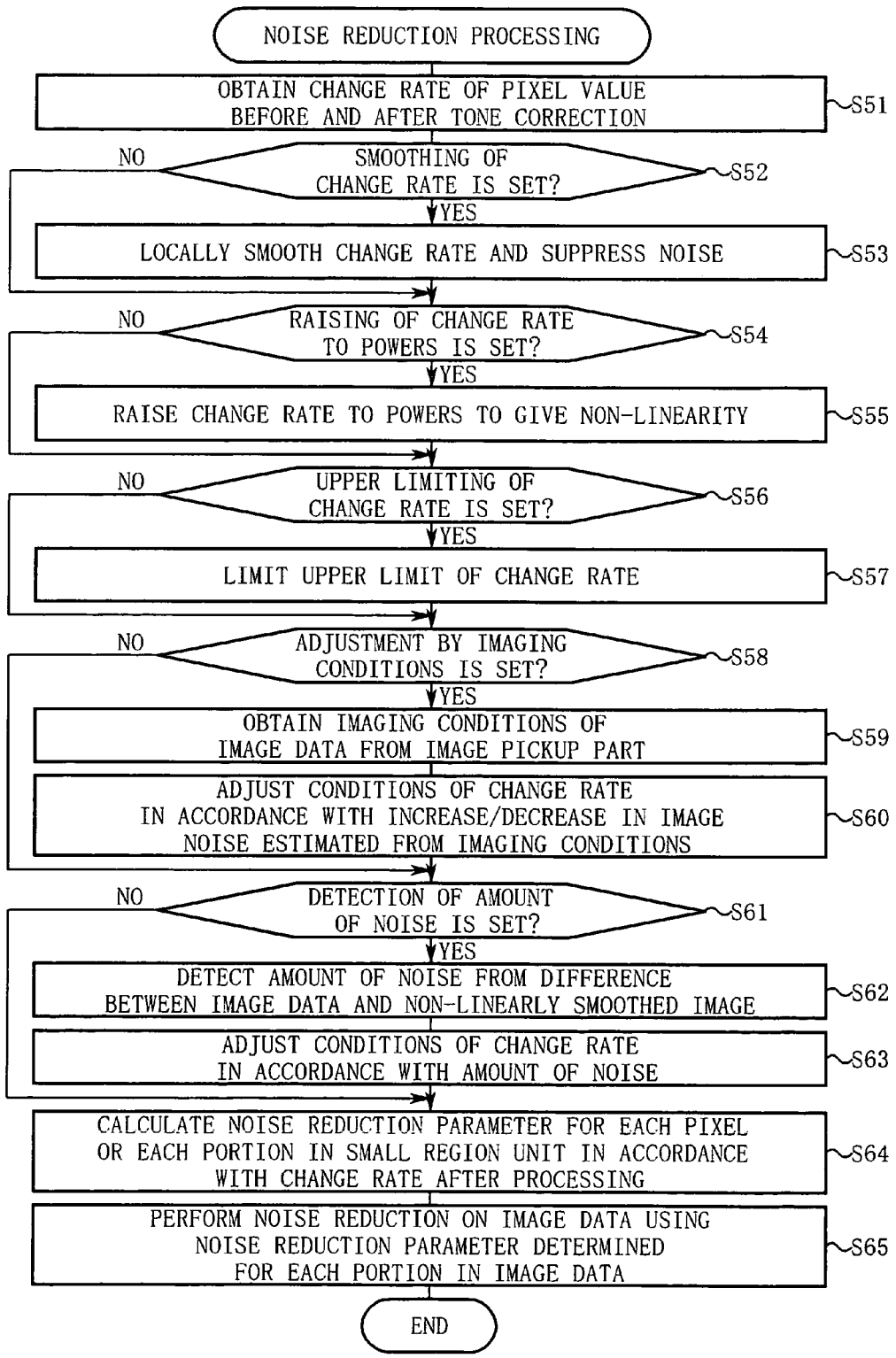

IMAGE PROCESSING DEVICE, IMAGE PROCESSING PROGRAM, IMAGE PROCESSING METHOD, AND ELECTRONIC CAMERA FOR CONTROLLING DEGREE OF NOISE REDUCTION IN IMAGE DATA

REFERENCE TO RELATED APPLICATION

This application is a continuation application of International Application PCT/JP 2004/17956, filed Dec. 2, 2004, designating the U.S., and claims the benefit of priority from Japanese Patent Application No. 2003-404425, filed on Dec. 3, 2003, the entire contents of which are incorporated herein by reference.

BACKGROUND OF THE INVENTION

1. Field of the Invention

The present invention relates to an image processing technique for controlling the degree of noise reduction in image data.

2. Description of the Related Art

[Prior Art of Tone Correction]

Generally, in photo shooting under the strong sunlight such as in a midsummer day, a strong contrast occurs in the face of a person and the like, which prevents clear tone reproduction of a portion hidden in a shadow or a highlighted portion. It is also difficult to clearly reproduce tone of a person photographed against the sun and hidden in silhouette etc.

There are known tone correction techniques to improve such lopsided tone representation such as histogram equalization and a technique disclosed in U.S. Pat. No. 5,991,456. These prior techniques are to improve tone collapse by performing tone correction to expand the tone range near or in the region of target pixel values of image data to be input.

[Prior Art of Noise Reduction]

Image data contains noise such as dark current of an image sensor and shot noise. There are known techniques to reduce such noise, such as a technique disclosed in Japanese Unexamined Patent Application Publication No. 2003-101887. In general, the prior techniques are to reduce noise by performing local smoothing so as to reduce the difference between neighboring pixels of image data to be input.

The inventor of the present invention has found the following problems of these prior arts.

With the tone correction described above, the tone of a dark portion of an image is expanded, making the image brighter. This makes amplitude of noise amplified and noise hidden in the dark portion conspicuous.

In this state, one image includes a portion at which noise is conspicuous and a portion at which noise is inconspicuous and has a kind of noise unevenness therein. The uneven noise causes visual unnaturalness more than the even noise, degrading visual quality of an image considerably.

With the conventional noise reduction method, it is able to achieve the effect of uniformly reducing the noise, but difficult to improve the above-mentioned noise unevenness.

In other words, in order to obtain a sufficient effect of noise reduction at a portion at which noise is conspicuous, it is necessary to increase the degree of noise reduction. In this case, however, the noise reduction functions excessively even at a portion at which noise is not conspicuous, resulting in unnecessarily losing fine detailed information on an image. This leads to creating the image data which gives the impression of lacking in the amount of information.

On the contrary, through the noise reduction in accordance with a portion at which noise is not conspicuous, noise is not sufficiently reduced from a portion at which noise is conspicuous, leaving unnatural noise unevenness.

SUMMARY OF THE INVENTION

An object of the present invention is to provide an image processing technique for properly reducing conspicuous noise by tone correction.

The present invention will be described below.

(1) An image processing device of the present invention changes a degree of noise reduction for image data in accordance with tone correction suitable for the image data and includes a change rate acquisition part and a noise reduction part. The change rate acquisition part obtains, at a plurality of portions in the image data, a change rate of a signal level of image data before and after tone correction. The noise reduction part controls the degree of noise reduction for image data in accordance with each of the portions in the image data.

(2) Preferably, the noise reduction part controls the degree of the noise reduction such that the larger the change rate the portions show, the larger the degree of the noise reduction the portions are given.

(3) The noise reduction part also preferably reduces a variation in noise by performing local smoothing on an arrangement of change rates in the image data. The noise reduction part controls the degree of noise reduction for image data according to the change rate after the local smoothing.

(4) The noise reduction part further preferably sets an upper limit of the change rate and controls the degree of noise reduction for image data according to the change rate with the upper limit set.

(5) The noise reduction part also preferably raises the change rate to powers and controls the degree of noise reduction for image data according to the change rate raised to powers.

(6) The noise reduction part further preferably acquires information on imaging conditions of an electronic camera that has imaged the image data and controls the degree of noise reduction for the image data in accordance with a condition which is a combination of at least the change rate and the imaging conditions.

(7) The image processing device of the present invention also preferably includes a noise judgment part that detects an amount of noise in image data. The noise reduction part controls the degree of noise reduction for the image data in accordance with a condition which is a combination of at least the above-mentioned change rate and the detected amount of noise.

(8) An image processing program of the present invention causes a computer to function as the image processing device according to any one of (1) to (7) described above.

(9) An image processing method of the present invention changes a degree of noise reduction for image data in accordance with tone correction suitable for the image data and includes the following steps:

Change rate acquisition step of obtaining, in the image data, the change rate of the signal level of image data before and after tone correction; and Noise reduction step of controlling the degree of noise reduction for each portion in the image data according to the change rate obtained in the change rate acquisition step.

(10) An electronic camera of the present invention includes an image pickup part, a tone correction part, and an image processing device. The image pickup part generates image data by imaging a subject. The tone correction part performs tone correction suitable for the image data. The image processing device is one according to any one of (1) to (7) described above. The image processing device performs noise reduction on the image data according to a change rate of the signal level before and after tone correction by the tone correction part.

The present invention obtains a change rate of a signal level before and after tone correction at a plurality of portions in image data, and switches degree of noise reduction for each portion in the image data according to the change rate.

The inventor of the present invention has discovered that a noise amplification factor changes according to the change rate of the signal level by tone correction and noise unevenness are caused by the noise amplification factor. The present invention, by conversely utilizing the phenomenon, controls the degree of noise reduction according to the change rate. As a result, it is made possible to suppress and eliminate the noise unevenness in the above-mentioned phenomenon, as well as to effectively make less conspicuous the unnatural noise unevenness that occurs in the image.

Other and further objects, features and advantages of the invention will appear more fully from the following description.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 is a flow chart for explaining a calculation procedure C of a tone correction coefficient; and FIG. 5 is a flow chart for explaining an operation of noise reduction.

DESCRIPTION OF THE PREFERRED EMBODIMENTS

[Explanation of the Configuration of the Present Embodiment]

Figure 1:
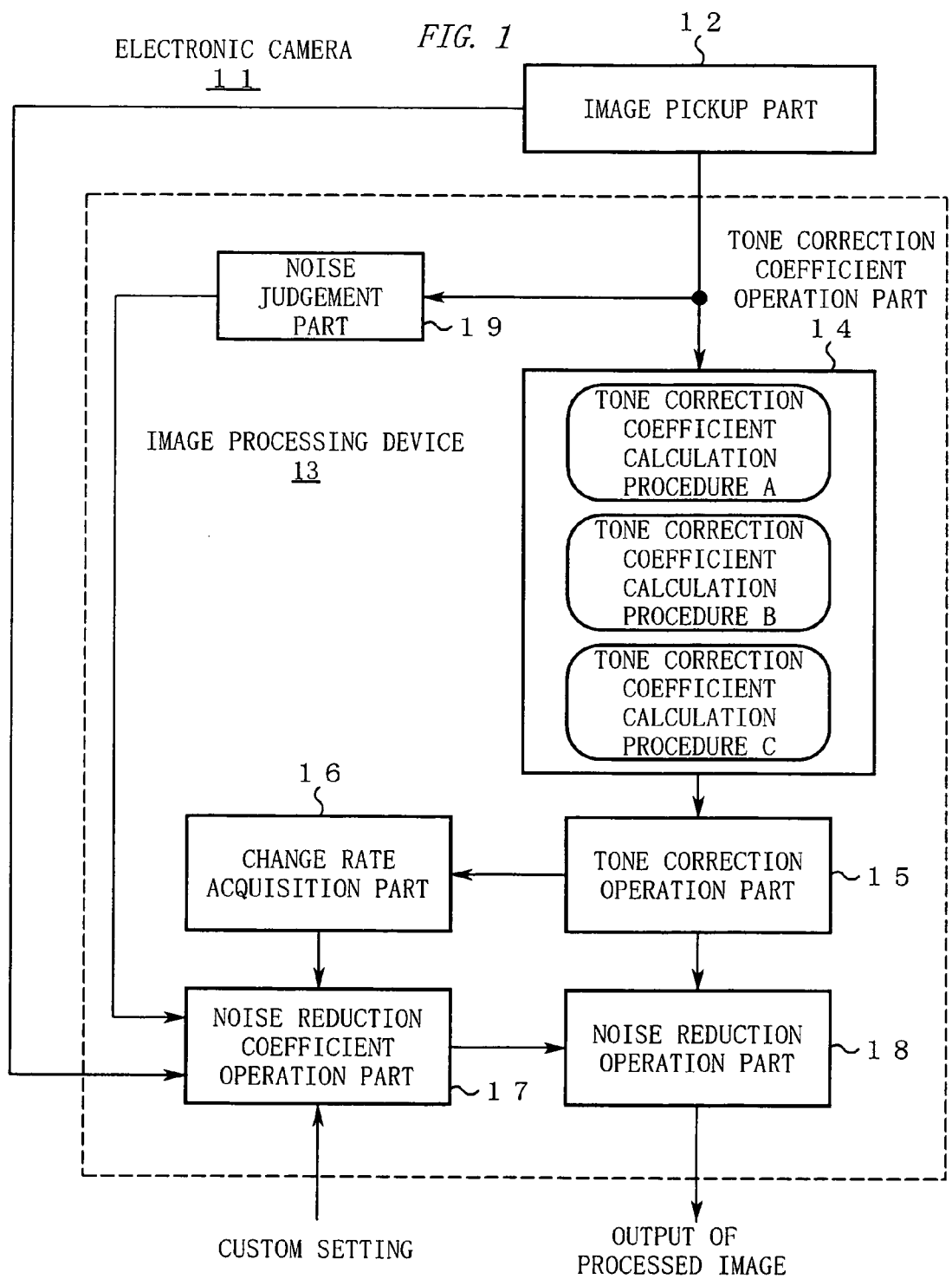
FIG. 1 is a diagram showing a configuration of an electronic camera 11 (including an image processing device 13) in an embodiment.

FIG. 1 is a diagram showing a configuration of an electronic camera 11 (including an image processing device 13) in the present embodiment.

In FIG. 1, the electronic camera 11 includes an image pickup part 12 for imaging a subject to generate image data and an image processing device 13.

The image processing device 13 includes the following components.

(1) A tone correction coefficient operation part 14: calculates a tone correction coefficient by analyzing image data.

(2) A tone correction operation part 15: performs tone correction of image data according to the tone correction coefficient.

(3) A change rate acquisition part 16: obtains a change rate of a signal level before and after tone correction.

(4) A noise reduction coefficient operation part 17: calculates a noise reduction coefficient according to the change rate.

(5) A noise reduction operation part 18: performs noise reduction on image data according to the noise reduction coefficient.

(6) A noise judgment part 19: estimates an amount of noise by analyzing image data.

Note that, it may also be possible to realize whole or part of a configuration of the image processing device 13 by software processing using a microprocessor, DSP, etc. It may also be possible to realize using hardware such as an operation circuit.

[Explanation of the Operation in the Present Embodiment]

The operation in the present embodiment is explained below.

First, the image pickup part 12 generates digital image data by imaging a subject in accordance with a release operation etc. of a user. The image data is input to the image processing device 13.

In the image processing device 13, first analysis of the input image data is performed by the tone correction coefficient operation part 14 and a tone correction coefficient suited to the image data is calculated.

Here, as a calculation procedure of a tone correction coefficient, three kinds of procedures A to C are described specifically.

<Calculation Procedure A of Tone Correction Coefficient>

Figure 2:
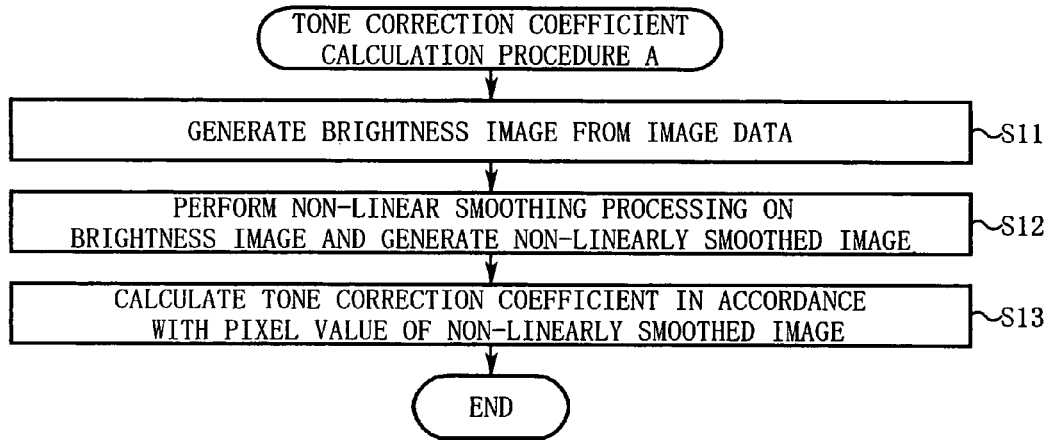
FIG. 2 is a flow chart for explaining a calculation procedure A of a tone correction coefficient.

FIG. 2 is a flow chart for explaining a calculation procedure A of a tone correction coefficient. The calculation procedure A is described according to the step number shown in FIG. 2.

[Step S11] First, the tone correction coefficient operation part 14 extracts a brightness component from the image data to be input and generates a brightness image V. The brightness component here corresponds to, for example, L of Lab color space, Y of YCbCr color space, V of HSV color space, G of RGB color space, and the like.

[Step S12] Next, the tone correction coefficient operation part 14 performs non-linear local smoothing processing on the generated brightness image V.

The following expression (1) is an example of a calculation expression of local smoothing processing.

$$Va(x, y) = \frac{\sum_{j,k=-r}^{r} \exp[-\{V(x+j, y+k) - V(x, y)\}^2 / \sigma^2] \cdot V(x+j, y+k)}{\sum_{j,k=-r}^{r} \exp[-\{V(x+j, y+k) - V(x, y)\}^2 / \sigma^2]} \quad (1)$$

Here, $(x, y)$ in the expression (1) is a pixel position to be processed; $r$ is a parameter corresponding to a size of a local range to be smoothed; and $\sigma$ is a parameter corresponding to a threshold value when distinguishing between large change in amplitude at a picture pattern portion and very small change in amplitude caused by noise. Preferably, $r=20$, $\sigma=30$ approximately, for example.

In such non-linear local smoothing processing, while the change in the amplitude of the edge etc. exceeding $\sigma$ is maintained, the very small change in the amplitude of noise etc. is smoothed. Due to such processing, a non-linearly smoothed image Va is generated.

[Step S13] The tone correction coefficient operation part 14 performs processing of the non-linearly smoothed image Va using the following expression (2). Here, for the pixel value Va (x, y), a normalizing processing and a setting process of the upper and lower limits are performed, and a normalized image Vb that takes a value in a numerical range [V1, 1] is generated.

$$Vb(x, y) = \begin{cases} \frac{1-Vl}{Vu} \cdot \frac{Va(x, y)}{V\max} + Vl & \text{if } \frac{Va(x, y)}{V\max} < Vu \\ 1 & \text{if } \frac{Va(x, y)}{V\max} \geq Vu \end{cases} \quad (2)$$

Here, Vmax in the expression (2) is the maximum range of the pixel value Va (x, y); Vu is a threshold value of the upper limit; and V1 is a lower limit value of the normalized image Vb. Preferably, as a specific value, Vu=0.5 and V1=0.25 approximately, for example.

Subsequently, the tone correction coefficient operation part 14 obtains a tone correction coefficient R (x, y) for each pixel by finding the reciprocal of a pixel value Vb (x, y) of the normalized image Vb.

$$R(x, y) = 1/Vb(x, y)$$

<Calculation Procedure B of Tone Correction Coefficient>

Figure 3:
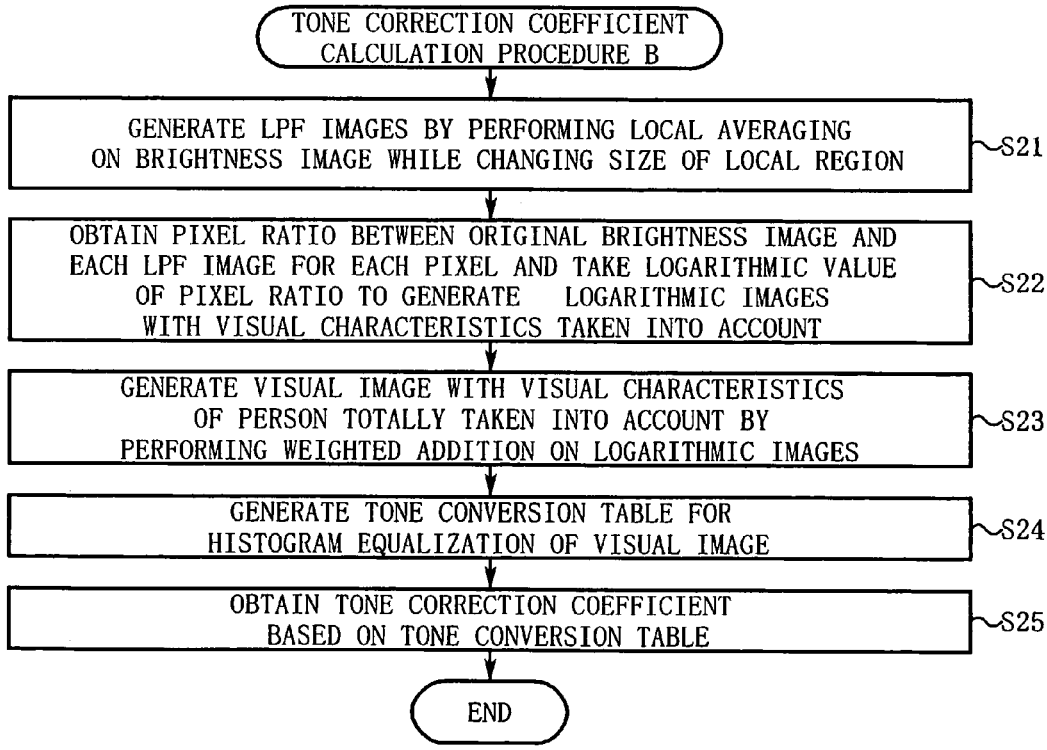
FIG. 3 is a flow chart for explaining a calculation procedure B of a tone correction coefficient.

FIG. 3 is a flow chart for explaining a calculation procedure B of a tone correction coefficient. The calculation procedure B is described according to the step number shown in FIG. 3.

[Step S21] The tone correction coefficient operation part 14 performs local averaging of the brightness image V while changing the size of the local region and generates a plurality of LPF images.

Note that, in such local averaging processing, it is preferable to create the LPF image at high speed by reducing the number of calculations using a recursive calculation that adds the difference from the local sum of the next pixel to the local sum of the previous pixel already calculated and known.

Further, it may also be possible to generate LPF images of various cutoff characteristics by finding a linear sum of the plurality of LPF images thus found.

[Step S22] The tone correction coefficient operation part 14 finds the signal level ratio between the brightness image V and each LPF image for each pixel using the following expression (3) and generates a plurality of logarithmic images Vi by calculating the logarithmic value of the pixel ratio. The logarithmic images are ones suited to the visual characteristics of a person sensitive to the local brightness contrast.

$$Vi(x,y) = \log [V(x,y)] - \log[LPFi\{V(x,y)\}] \quad (3)$$

[Step S23] The tone correction coefficient operation part 14 generates a visual image Vd with the human visual characteristics totally taken into consideration by performing weighted addition of the plurality of logarithmic images Vi for each pixel using the following expression (4).

$$Vd(x, y) = \sum_i Wi \cdot Vi(x, y) \quad (4)$$

Here, a weighting coefficient Wi in the expression (4) may be set all together to the same value. Further, it may also be possible to adjust the magnitude of the weighting coefficient Wi in accordance with the coincidence degree between the individual logarithmic images Vi and the visual characteristics.

[Step S24] The tone correction coefficient operation part 14 finds the cumulative histogram of the visual image Vd.

Next, the tone correction coefficient operation part 14 normalizes the cumulative histogram in accordance with the signal range of the brightness image V and creates a histogram-equalized tone conversion table.

[Step S25] The tone correction coefficient operation part 14 performs tone correction on the brightness image V according to the tone conversion table and generates a converted brightness image Ve.

Subsequently, the tone correction coefficient operation part 14 obtains a tone correction coefficient R (x, y) by finding the ratio between a pixel value Ve (x, y) of the converted brightness image Ve and the pixel value V (x, y) of the brightness image V for each pixel.

$$R(x,y) = Ve(x,y)/V(x,y)$$

<Calculation Procedure C of Tone Correction Coefficient>

FIG. 4 is a flow chart for explaining a calculation procedure C of a tone correction coefficient. The calculation procedure C is described according to the step number shown in FIG. 4.

[Step S31] The tone correction coefficient operation part 14 creates a differential image P by performing a spatial differentiation of the following expression on the brightness image V.

$$\left(\frac{\partial^2}{\partial x^2} + \frac{\partial^2}{\partial y^2}\right)V(x, y) = P(x, y) \quad (5)$$

Note that, specifically, it is only necessary to perform local multiplication and addition operation by the following Laplacian filter A on the brightness image V.

$$A = \begin{pmatrix} 0 & 1 & 0 \\ 1 & -4 & 1 \\ 0 & 1 & 0 \end{pmatrix} \quad (6)$$

[Step S32] Here, based on the differential image P, a processed image Un that stores the local brightness contrast is generated. First, the tone correction coefficient operation part 14 performs the repetitive operation of the following recursive formula after initializing all initial values Uo (x, y) of the processed image Un to a constant C. Note that, it is preferable to set the constant C to the average value of the V signal.

$$U_n(x, y) = \quad (7)$$
$$\frac{1}{4}(U_{n-1}(x+1, y) + U_n(x-1, y) + U_{n-1}(x, y+1) + U_n(x, y-1)) -$$
$$\frac{1}{4}P(x, y)$$

In the expression (7), due to the term of the differential value P (x, y) on the right-hand side, the local brightness contrast of the processed image Un is kept substantially the same as that of the brightness image V before differentiation. Further, by repetition of the recursive formula, the local brightness contrast gradually spreads to the peripheral area.

Here, it is preferable to perform the repetitive calculation with as high precision as possible by using a floating-point operation in order to prevent the influence of loss of places or error accumulation.

[Step S33] The tone correction coefficient operation part 14 stops the repetitive operation when the spread size of the differential value P extends to a degree so as to be recognized as an image and before a stage at which the brightness contrast level of the entire image is reproduced fully (a stage at which convergence is insufficient).

If the repetitive operation is thus stopped, the operation of the tone correction coefficient operation part 14 proceeds to step S34.

On the other hand, until the end point of the repetitive operation is detected, the tone correction coefficient operation part 14 returns its operation to step S32 and continues the repetitive operation.

[Step S34] The signal range of the processed image Un that has ended the repetitive operation is narrower than that of the original brightness image V because the brightness contrast level of the entire image is not reproduced fully. Then, the tone correction coefficient operation part 14 performs level adjustment so that the signal range of the processed image Un is rearranged in the signal range of the brightness image V. After the level adjustment, the processed image U is obtained.

For example, according to the following expression, level adjustment of the processed image Un is performed to obtain a processed image U after level adjustment.

$$U(x, y) = \frac{R}{(\max - \min)} (U_n(x, y) - \min) \qquad (8)$$

(Here, max is the maximum level of the processed image Un, min is the minimum level of the processed image Un, and R is the width of the signal range of the brightness image V).

Normally, visual sense of a person is more sensitive to the local brightness contrast and its relationship of magnitude than to the absolute brightness level. If a person gazes at a bright region in the visual field, the local brightness contrast in the bright region becomes visibly remarkable. If the dark region is gazed at, the local brightness contrast in the dark region becomes visibly remarkable.

Therefore, the above-mentioned processed image U can be regarded as an image in a state close to one after subjected to human visual characteristics and which has the impression of being recognized in the visual area in a brain in that the local brightness contrast is enhanced in both the bright and the dark regions.

[Step S35] The tone correction coefficient operation part 14 sets a predetermined ratio C1:C2 based on the degree of tone correction set by a user (C1 is an addition coefficient of the processed image U and C2 is an addition coefficient of the brightness image V).

[Step S36] The tone correction coefficient operation part 14 adds the signal value of the processed image U and the signal value of the brightness image V in the predetermined ratio for each pixel based on the following expression. By this addition processing, an added image S is obtained.

$$S(x,y)=[C1 \cdot U(x,y)+C2 \cdot V(x,y)]/(C1+C2) \qquad (9)$$

Here, if the addition coefficient C1 of the processed image U is increased, it is possible to enhance tone correction. On the other hand, if the addition coefficient C2 of the brightness image V is increased, it is possible to moderately apply tone correction.

[Step S37] The tone correction coefficient operation part 14 judges the operation mode of tone correction custom-set in advance.

Here, when the contrast moderate mode is selected, the operation of the tone correction coefficient operation part 14 proceeds to the step S38.

When the daytime digital synchronization mode is selected, the operation of the tone correction coefficient operation part 14 proceeds to step S39.

On the other hand, when the highlight tone restoration mode is selected, the operation of the tone correction coefficient operation part 14 proceeds to step S40.

[Step S38] When the contrast moderate mode is selected, the tone correction coefficient operation part 14 regards the added image S as is as a synthesized image D. After such the operation, the flow proceeds to step S41.

[Step S39] When the daytime digital synchronization mode is selected, the tone correction coefficient operation part 14 performs image synthesis based on the following expression.

$$D(x,y)=\max[S(x,y),V(x,y)] \qquad (10)$$

Here, the synthesized image D is generated by comparing the pixel values of the brightness image V and the added image S and selecting the brighter pixel value for synthesis.

[Step S40] when the highlight tone restoration mode is selected, the tone correction coefficient operation part 14 performs image synthesis based on the following expression.

$$D(x,y)=\min[S(x,y),V(x,y)] \qquad (11)$$

Here, the synthesized image D is generated by comparing the pixel values of the brightness image V and the added image S and selecting the darker pixel value for synthesis.

[Step S41] The tone correction coefficient operation part 14 obtains the tone correction coefficient R (x, y) by finding the ratio of the pixel value D (x, y) of the synthesized image D to the pixel value V (x, y) of the brightness image V for each pixel.

$$R(x,y)=D(x,y)/V(x,y)$$

<Explanation of the Operation of the Tone Correction Operation Part 15>

The tone correction coefficient R (x, y) found for each pixel by the above-mentioned processing is input to the tone correction operation part 15. The tone correction operation part 15 performs tone correction on image data according to the tone correction coefficient R (x, y).

Specific processing of the tone correction is described below.

First, the tone correction operation part 15 performs the following soft limit processing to prevent the tone correction coefficient R (x, y) from becoming too large and finds a change rate g (x, y).

$$g(x, y) = \left\{ \frac{sR(x, y)^m}{s + R(x, y)^m} \right\}^{1/m} \qquad (12)$$

Here, S in the expression (12) is a parameter for the upper limit value and m is a parameter for the degree how the limit is set. Preferably, S=20 and m=1 approximately, for example.

Note that, it may also be possible to set the lower limit value of the change rate g (x, y) using the following expression (13) to prevent the change rate g (x, y) from becoming too small.

$$g(x, y) = \begin{cases} \left\{ \frac{sR(x, y)^m}{s + R(x, y)^m} \right\}^{1/m} & \text{if } R(x, y) > \left(\frac{s}{s-1}\right)^{1/m} \\ 1 & \text{if } R(x, y) \le \left(\frac{s}{s-1}\right)^{1/m} \end{cases} \qquad (13)$$

The tone correction operation part 15 performs tone correction on image data by multiplying the change rate g (x, y) found for each pixel by each pixel value of the image data.

For example, in the case of the brightness image V or the RGB image, the tone correction operation part 15 directly multiplies the change rate g (x, y) by these pixel values.

$$Vo(x,y)=V(x,y) \cdot g(x,y)$$

$$Ro(x,y)=R(x,y) \cdot g(x,y) \quad (14)$$

$$Go(x,y)=R(x,y) \cdot g(x,y)$$

$$Ro(x,y)=R(x,y) \cdot g(x,y) \quad (15)$$

Note that, in the case of the image data of the Lab color space, the tone correction operation part 15 performs tone correction in the following procedure.

First, the tone correction operation part 15 multiplies the change rate g (x, y) as is by the brightness component L and multiplies the change rate g (x, y) moderately by the color components a and b, to maintain its hue.

$$Lo(x,y)=L(x,y) \cdot g(x,y)$$

$$ao(x,y)=a(x,y) \cdot g(x,y)^{0.75}$$

$$bo(x,y)=b(x,y) \cdot g(x,y)^{0.75} \quad (16)$$

Here, it may also be possible to use the expression (17) instead of the expression (16) by preparing in advance conversion tables Ta and Tb that maintain the hue of the color components a and b.

$$Lo(x,y)=L(x,y)g(x,y)$$

$$ao(x,y)=Ta\{a(x,y)g(x,y)\}$$

$$bo(x,y)=Tb\{b(x,y)g(x,y)\} \quad (17)$$

However, in the Lab color space, it is not possible to take an arbitrary value but a value in a predetermined color region. If a value outside the color region is taken, there arises the possibility that the signal saturates and the tone disappears.

Then, when performing tone correction on the image signal of sRGB color, the upper limit of the sRGB color region in the Lab color space is approximated to three planes as follows.

$$\begin{cases} 0.5a+0.15b+L=100 & \text{if } b \geq -\frac{0.6}{0.95}a \text{ and } b \geq -\frac{0.65}{0.08}a \\ -0.1a-0.8b+L=100 & \text{if } b < -\frac{0.6}{0.95}a \text{ and } b < \frac{0.05}{0.87}a \\ -0.15a+0.07b+L=100 & \text{if } b \geq \frac{0.05}{0.87}a \text{ and } b < -\frac{0.65}{0.08}a \end{cases} \quad (18)$$

Next, an original (L, a, b) and a (Lo, ao, bo) after multiplied by the change rate are connected by a straight line and a crossing (Lx, ax, bx) of the straight line and any one of the above-mentioned three planes $k_1 a + k_2 b + L = 100$ is calculated using the following expression.

$$Lx = L+(Lo-L)t \quad (19)$$

$$ax = a+(ao-a)t$$

$$bx = b+(bo-b)t$$

$$\text{where, } t = \frac{100-(k_1 a + k_2 b + L)}{k_1(ao-a)+k_2(bo-b)+(Lo-L)}$$

Next, the tone correction operation part 15 calculates $$Rl = \frac{\sqrt{(Lo-L)^2+(ao-a)^2+(bo-b)^2}}{\sqrt{(Lx-L)^2+(ax-a)^2+(bx-b)^2}} \quad (20)$$

R1 found here corresponds to the distance between (L, a, b) and (Lo, ao, bo) when it is assumed that the distance between (L, a, b) and the crossing (Lx, ax, bx) is a numerical value "1". When the distance R1 exceeds 1, the sRGB color region is exited. Therefore, the tone correction operation part 15 applies soft limit to R1 using the following expression.

$$t' = \left\{\frac{sRl^m}{s+Rl^m}\right\}^{1/m} \quad (21)$$

Here, preferably, S=1 and m=2 approximately.

Using t' thus found, the tone correction operation part 15 calculates $$Lo'=L+(Lx-L)t'$$

$$ao'=a+(ax-a)t'$$

$$bo'=b+(bx-b)t' \quad (22)$$

and sets a value (Lo', ao', bo') that falls within the color region to a value after tone correction.

Note that, it may also be possible to find a value (Lo", ao", bo") that falls within the color region by a simple calculation for finding an interior division point between (L, a, b) and (Lo, ao, bo) using the following expression (23) and set it to a value after tone correction.

$$Lo''=L(1-y)+Loy$$

$$ao''=a(1-y)+aoy$$

$$bo''=b(1-y)+boy \quad (23)$$

Here, y in the expression (23) is an interior division ratio and preferably, y=0.5 approximately, for example.

<Explanation of the Operation of Noise Reduction>

FIG. 5 is a flow chart for explaining the operation of noise reduction.

The operation of the noise reduction is described below according to the step number shown in FIG. 5.

[Step S51] The change rate acquisition part 16 obtains the change rate of the signal level before and after tone correction from the tone correction operation part 15. For the tone correction of the brightness image V or the RGB image described above, it is only necessary to obtain the change rate g (x, y) as is. Further, for the tone correction of the Lab image described above, it is only necessary to obtain the signal level before and after that from the tone correction operation part 15, divide it for each pixel, and calculate the change rate. Here, about the pixel whose signal level before tone correction is zero, it is preferable to set the change rate to a predetermined value (for example, "1").

[Step S52] The noise reduction coefficient operation part 17 stores in advance the custom setting by a designer or a user. Here, the noise reduction coefficient operation part 17 judges the custom setting for the smoothing of change rate.

Here, in the case where the smoothing of change rate is set, the operation of the noise reduction coefficient operation part 17 proceeds to step S53.

On the other hand, in the case where omitting the smoothing of change rate is set, the operation of the noise reduction coefficient operation part 17 proceeds to step S54.

[Step S53] The noise reduction coefficient operation part 17 performs local smoothing on the arrangement of the change rate g (x, y) in the image data. By the local smoothing, the noise included in the change rate g (x, y) is suppressed. Further, the spatial change of the change rate g (x, y) becomes smoother.

[Step S54] Next, the noise reduction coefficient operation part 17 judges the custom setting for the raising of change rate to powers.

Here, in the case where performing the raising of rate change to powers is set, the operation of the noise reduction coefficient operation part 17 proceeds to step S55.

On the other hand, in the case where omitting the raising of change rate to powers is set, the operation of the noise reduction coefficient operation part 17 proceeds to step S56.

[Step S55] The noise reduction coefficient operation part 17 raises the change rate g (x, y) to powers and applies non-linearity to the change rate g (x, y). For example, by raising to the N-th (N>1) power, it is possible to cumulatively enhance increasing change of the change rate g(x, y) and enhance noise reduction remarkably at a portion at which the change rate g(x, y) is large.

[Step S56] Further, the noise reduction coefficient operation part 17 judges the custom setting for the upper limit of change rate.

Here, when the custom setting is to set the upper limit of change rate, the operation of the noise reduction coefficient operation part 17 proceeds to step S57.

On the other hand, the custom setting is to omit setting the upper limit of change rate, the operation of the noise reduction coefficient operation part 17 proceeds to step S58.

[Step S57] The noise reduction coefficient operation part 17 sets the upper limit of the change rate g (x, y). Setting the upper limit makes it possible to avoid the noise reduction to be described later from becoming excessive.

[Step S58] Next, the noise reduction coefficient operation part 17 judges the custom setting for making adjustment by imaging conditions.

Here, in the case where making the adjustment by imaging conditions is set, the operation of the noise reduction coefficient operation part 17 proceeds to step S59.

On the other hand, in the case where omitting making the adjustment by imaging conditions is set, the operation of the noise reduction coefficient operation part 17 proceeds to step S61.

[S59] The noise reduction coefficient operation part 17 acquires the imaging conditions relating to the amount of noise in image data from the image pickup part 12. As the imaging conditions, for example, the image pickup sensitivity, the exposure time, the noise reduction in the image pickup part 12, etc., are important in particular.

[Step S60] When estimating that the amount of noise in the image data is large from the imaging conditions, the noise reduction coefficient operation part 17 adjusts the change rate g (x, y) in a large scale as a whole. On the contrary, if the amount of noise is judged to be small from the imaging conditions, the change rate g (x, y) is adjusted in a small scale as a whole.

[Step S61] The noise reduction coefficient operation part 17 further judges the custom setting for the detection of the amount of noise.

Here, in the case where performing the detection of the amount of noise is set, the operation of the noise reduction coefficient operation part 17 proceeds to step S62.

On the other hand, in the case where omitting the detection of the amount of noise is set, the operation of the noise reduction coefficient operation part 17 proceeds to step S64.

[Step S62] The noise judgment part 19 performs the non-linear smoothing similar to the expression (1) described above on the image data before tone correction (for example, r=1, σ=10) and generates a non-linearly smoothed image.

The noise judgment part 19 extracts the noise of very small amplitude by finding the difference between the image data and the non-linearly smoothed image for each pixel. The amount of noise is detected by finding the variance of the very small amplitude.

The information of the amount of noise thus detected is transmitted to the noise reduction coefficient operation part 17.

[Step S63] When estimating that the amount of noise is large, the noise reduction coefficient operation part 17 adjusts the change rate g (x, y) in a large scale as a whole. On the contrary, if the amount of noise is judged to be small, the change rate g (x, y) is adjusted in a small scale as a whole.

[Step S64] The distribution of the change rate in the image data that has gone through the processing described above exhibits a high correlation with the noise unevenness that occur after tone correction. Therefore, it is possible to reduce the unevenness of the noise unevenness by adjusting the noise reduction parameter in accordance with the distribution of the change rate in the image data.

[Step S65] The noise reduction parameter thus generated is transmitted to the noise reduction operation part 18.

The noise reduction operation part 18 controls the degree of noise reduction according to the noise reduction parameter and reduces the unnatural noise unevenness (in particular, the noise on the dark side) caused by the tone correction.

<Example of the Operation Expression for Noise Reduction>

A concrete example of an operation expression for noise reduction is described below.

First, as a filter for noise reduction, a non-linear local smoothing filter as described below is used.

$$Zi(x, y) = \frac{\sum_{j,k=-ri}^{ri} \exp[-\{Pi(x+j, y+k) - Pi(x, y)\}^2 / \sigma i^2] \cdot Pi(x+j, y+k)}{\sum_{j,k=-ri}^{ri} \exp[-\{Pi(x+j, y+k) - Pi(x, y)\}^2 / \sigma i^2]} \quad (24)$$

Here, Pi in the expression (24) corresponds to each component of the color image data. Incidentally, here, explanation is given on the assumption that $P_0$ corresponds to the brightness component, such as L, and $P_{1,2}$ corresponds to the color components, such as a and b.

In this case, the noise reduction parameter that determines the degree of noise reduction is the size ri of the smoothing range and the threshold value σi that discriminates the noise amplitudes.

It is preferable to determine the noise reduction parameters using the following expression (25)

$$r_0(x,y) = \lfloor 0.1 \cdot g_0(x,y)^2 \rfloor$$

$$\sigma_0(x,y) = 0.3 \cdot g_0(x,y)^2$$

$$r_{1,2}(x,y) = \lfloor 0.75 \cdot g_{1,2}(x,y)^2 \rfloor$$

$$\sigma_{1,2}(x,y) = 2.25 \cdot g_{1,2}(x,y)^2 \quad (25)$$

where $\lfloor \ \rfloor$ is the rounding down operation.

Here, $g_{0,1,2}$ is the change rate of each component before and after tone correction. In the expression (25), noise reduction is enhanced cumulatively according to an increase in change rate by raising the change rate to powers (to the second power, here). As a result, it is possible to properly reduce the noise unevenness that is likely to be conspicuous at a portion corrected from the dark portion to the bright portion.

Note that, as to the smoothing range ri, it is preferable to limit the degree of the noise reduction by setting the upper limit as shown by the following expression (26) and prevent detailed information in the high frequency region from dropping off due to the noise reduction.

$$r_0(x, y) = \begin{cases} \lfloor 0.1 \cdot g_0(x, y)^2 \rfloor & \text{if } \lfloor 0.1 \cdot g_0(x, y)^2 \rfloor < r_{0,max} \\ r_{0,max} & \text{if } \lfloor 0.1 \cdot g_0(x, y)^2 \rfloor \geq r_{0,max} \end{cases} \quad (26)$$

$$r_{1,2}(x, y) = \begin{cases} \lfloor 0.75 \cdot g_{1,2}(x, y)^2 \rfloor & \text{if } \lfloor 0.75 \cdot g_{1,2}(x, y)^2 \rfloor < r_{1,2,max} \\ r_{1,2,max} & \text{if } \lfloor 0.75 \cdot g_{1,2}(x, y)^2 \rfloor r_{1,2,max} \end{cases}$$

In addition, the amount of noise in the image data changes considerably depending on an image pickup sensitivity A. Therefore, as shown in the following expression (27), it is preferable to increase or decrease the noise reduction parameters ri and σi depending on the image pickup sensitivity A.

$$r_0(x,y) = \lfloor 0.1\sqrt{A/200} \cdot g_0(x,y)^2 \rfloor$$

$$\sigma_0(x,y) = 0.3\sqrt{A/200} \cdot g_0(x,y)^2$$

$$r_{1,2}(x, y) = \lfloor 0.75\sqrt{A/200} \cdot g_{1,2}(x, y)^2 \rfloor$$

$$\sigma_{1,2}(x,y) = 2.25\sqrt{A/200} \cdot g_{1,2}(x,y)^2 \quad (27)$$

In this expression (27), when the image pickup sensitivity is equal to or more than 200, noise reduction is enhanced and when the image pickup sensitivity is less than 200, noise reduction is moderated.

Further, it is preferable to increase or decrease the noise reduction parameters ri and σxi according to the variance Si of very small amplitude of each component found in the above-mentioned step S62 as shown by the following expression (28).

$$r_0(x,y) = \lfloor 0.1\{0.1S_0 \cdot g_0(x,y)\}^2 \rfloor$$

$$\sigma_0(x,y) = 0.3\{0.1S_0 \cdot g_0(x,y)\}^2$$

$$r_{1,2}(x,y) = \lfloor 09.75\{0.1S_{1,2} \cdot g_{1,2}(x,y)\}_2 \rfloor$$

$$\sigma_{1,2}(x,y) = 2.25\{0.1S_{1,2} \cdot g_{1,2}(x, y)\}^2 \quad (28)$$

[Effects of the Present Embodiment Etc.]

As described above, in the present embodiment, the change rate of the signal level before and after tone correction is obtained for each pixel. At a portion at which the change rate is larger, the noise amplification factor after tone correction is higher and brighter and noise becomes more conspicuous. Accordingly, there is a strong causal relation between the distribution of change rate in the image data and the noise unevenness caused by tone correction. Therefore, in the present embodiment, by controlling the degree of noise reduction in the image data according to the change rate, it is possible to reduce the unnatural change in the noise unevenness and make it less conspicuous.

Further, in the present embodiment, local smoothing is performed on the arrangement of change rate in the image data. Due to such local smoothing, the steep 20 change in change rate is suppressed. As a result, the noise component included in the change rate becomes small. Further, the peak or steep variations of the change rate is suppressed and shaped smoothly. By changing the degree of noise reduction according to the change rate after such smoothing, the control of the degree of noise reduction is also performed smoothly.

As a result, the degree of noise reduction no longer varies by the noise component in the change rate. It is also possible to prevent troubles such that the degree of noise reduction changes unnaturally and suddenly to produce variations on the contrary.

Further, in the present embodiment, it is possible to suppress the excessive change in the degree of noise reduction by setting the upper limit of the change rate.

Moreover, in the present embodiment, the non-linear processing is performed by raising the change rate to powers. As a result, it is made possible to flexibly control the inclination of the change in degree of noise reduction and the change in noise unevenness can be more properly reduced.

Furthermore, in the present embodiment, the degree of noise reduction is controlled by combining the imaging conditions and the change rate. Therefore, it is made possible to cope with a total increase/decrease in noise caused by the imaging conditions and the noise unevenness can be reduced more suitably.

Still further in the present embodiment, the amount of noise in image data is detected and by combining the amount of noise and the change rate, the degree of noise reduction is controlled. Therefore, it is made possible to directly cope with a total

[Supplementary Items of the Embodiment]

Note that, in the embodiment described above, the case where the present invention is employed in the electronic camera 11 is described. However, it may also be possible to create an image processing program that performs the image processing method described above (FIG. 5). By causing a computer to execute the image processing program, it is possible to cause the computer to function as the image processing device 13.

In the embodiment described above, noise reduction is performed on the image data after tone correction. However, the present invention is not limited thereto. It is also made possible to perform noise reduction before tone correction by determining the degree of noise reduction by estimating the signal level before and after tone correction.

In addition, it is also possible to divide noise reduction between before and after tone correction and perform respectively. In general, since tone correction is non-linear processing, it is possible to further enhance the reduction effect of noise unevenness of the present invention by adequately adjusting the division ratio of noise reduction between before and after the tone correction.

Further, in step S62 in the embodiment described above, the amount of noise is detected from the image data before tone correction. The amount of noise in this case is the amount of noise before receiving the influence of the change rate of the tone correction. Therefore, it is possible to easily grasp the state of noise unevenness after tone correction by combining the amount of noise and the change rate. As a result, the high reduction effect of noise unevenness can be obtained.

However, the present invention is not limited thereto. For example, it may also be possible to detect the amount of noise from the image data after tone correction. In detection of the amount of noise, the absolute level of noise after tone correction is detected. Therefore, it is possible to easily grasp the absolute level of noise unevenness by combining the amount of noise and the change rate after tone correction. As a result, also by such the operation, the reduction effect of noise unevenness can be enhanced.

Note that, in the embodiment described above, the change rate is obtained for each pixel. However, the present invention is not limited thereto. For example, it may also be possible to obtain it for a plurality of portions in the image data. In this case, it is possible to reduce the noise unevenness by switching the degrees of noise reduction according to the change rate at each portion.

Further, in the embodiment described above, as the filter for noise reduction, the processing in the expression (24) is used. However, the present invention is not limited thereto. For example, it may also be possible to use the processing of the following expression (29) instead. Here, the meaning of the symbols in the expression (29) is the same as that in the expression (24), therefore, its explanation is omitted here.

$$Zi(x, y) = Pi(x, y) + \frac{\sum_{j,k=-ri}^{ri} \exp[-\{Pi(x+j, y+k) - Pi(x, y)\}^2 / \sigma i^2][Pi(x+j, y+k) - Pi(x, y)]}{\sum_{j,k=-ri}^{ri} \exp(0)} \quad (29)$$

In addition, in the embodiment described above, the strength of the noise filter is changed by changing the parameter of the smoothing filter according to the change rate $g(x, y)$. However, the present invention is not limited thereto. For example, it may also be possible to perform weighted average of the image subjected to the noise filter processing with a uniform strength and the image subjected to moderate noise filter processing or no processing. By changing the weighted ratio according to the change rate $g(x, y)$, the strength adjustment of the noise filter processing is substantially realized.

As a concrete example of the processing, processing in steps 1 to 3 is preferable.

Step 1: performs tone correction and finds the change rate $g(x, y)$.

Step 2: performs noise filter processing according to the camera setting, the amount of noise detection, or the parameters determined in advance.

Step 3: determines the weighted ratio according to the change rate $g(x, y)$ and performs the weighted average between the image $I(x, y)$ before the noise filter processing and the image $I'(x, y)$ after the noise filter processing. At this time, increases the weighted ratio of the image $I'(x, y)$ after the noise filter processing for the greater change rate $g(x, y)$.

It may also be possible to create the image Iout$(x, y)$ after weighted average using the weighted average processing as shown by the following expression (30) on the assumption that, for example, the change rate $g(x, y)$ is in the range of $1 \leq g(x, y) \leq z$.

$$Iout(x, y) = \left[1 - \frac{g(x, y) - 1}{z - 1}\right] \cdot I(x, y) + \left[\frac{g(x, y) - 1}{z - 1}\right] \cdot I'(x, y) \quad (30)$$

Further, in the embodiment described above, the parameter S relating to the upper limit value is used in the expression (12), (13), or (21). However, the present invention is not limited thereto. For example, it may also be possible to change the parameter S in accordance with the parameter m for the degree how the limit is set. For example, it is preferable to replace the parameter S with the expression $S^m$.

The invention is not limited to the above embodiments and various modifications may be made without departing from the spirit and scope of the invention. Any improvement may be made in part or all of the components.

What is claimed is:

1. An image processing device that changes a degree of noise reduction for color image data represented by a brightness component and chromatic components, in accordance with tone correction suitable for the color image data, comprising:
   a change rate acquisition part that obtains, at a plurality of portions in the color image data, a change rate of a signal level of the color image data due to the tone correction, the change rate is calculated based on a ratio of brightness values before and after the tone correction; and
   a noise reduction part that controls the degree of the noise reduction for each of the portions in the color image data in accordance with the change rate, the noise reduction includes noise filtering of the chromatic components.

2. The image processing device according to claim 1, wherein
   said noise reduction part controls the degree of the noise reduction such that the larger the change rate the portions show, the larger the degree of the noise reduction the portions are given.

3. The image processing device according to claim 1, wherein
   said noise filtering of the chromatic components is performed by a weighted average based on a difference between a target pixel and neighboring pixels.

4. The image processing device according to claim 1, wherein
   said noise reduction part sets an upper limit of the change rate and controls the degree of noise reduction for the color image data in accordance with the change rate with the set upper limit.

5. The image processing device according to claim 1, wherein
   said noise reduction part raises the change rate to powers and controls the degree of noise reduction for the color image data in accordance with the change rate raised to powers.

6. The image processing device according to claim 1, wherein
   said noise reduction part obtains information on an imaging condition of an electronic camera that has imaged the color image data and controls the degree of noise reduction for the color image data in accordance with a condition which is a combination of at least the change rate and the imaging condition.

7. The image processing device according to claim 1, further comprising a noise judgment part that detects an amount of noise in the color image data, wherein
   said noise reduction part controls the degree of noise reduction for the color image data in accordance with a condition which is a combination of at least the change rate and the amount of noise.

8. A computer-readable medium encoded with an image processing program that causes a computer to function as the image processing device according to claim 1.

9. An image processing method that changes a degree of noise reduction for color image data represented by a brightness component and chromatic components in accordance with tone correction suitable for color image data, the method implemented by a computer processor and comprising the steps of:

obtaining, in the color image data, a change rate of a signal level of the color image data due to the tone correction, the change rate is calculated based on a ratio of brightness values before and after the tone correction; and controlling a degree of the noise reduction at each portion in the color image data in accordance with the change rate, the noise reduction includes noise filtering of the chromatic components.

10. An electronic camera comprising:

an image pickup part that images a subject and generates color image data;

a tone correction part that performs tone correction suitable for the color image data; and the image processing device according to claim 1, wherein said image processing device performs noise reduction on color image data according to a change rate of a signal level due to tone correction by said tone correction part.

11. The image processing device according to claim 1, wherein said noise reduction includes noise filtering of the brightness component and the noise filtering of the chromatic components, and said noise reduction part individually sets a parameter for each of the noise filtering performed in accordance with the change rate.

* * * * *